United States Patent Office 3,202,668
Patented Aug. 24, 1965

3,202,668
N-AMINOPHENINDAMINIUM SALTS
Bernard Rudner, Pittsburgh, Pa., and Mary Jo Walch, Baltimore, Md., assignors to W. R. Grace & Co., New York, N.Y., a corporation of Connecticut
No Drawing. Filed May 22, 1962, Ser. No. 196,607
5 Claims. (Cl. 260—296)

The present application is a continuation-in-part of our earlier filed application 761,297 filed September 16, 1958, now abandoned.

This invention relates to quaternary nitrogenous salts. In one specific aspect, it relates to N-aminophenindaminium salts.

It is an object of the present invention to provide a new generic class of pharmaceutically useful compounds.

The compounds of our invention are conveniently prepared by the action of chloramine on the appropriate tertiary amine. In the preferred practice of this invention, the reactant tertiary amine dissolved in an unreactive solvent is exposed to a stream of gaseous chloramine. The resultant N-aminophenindaminium chloride is isolated by conventional laboratory techniques. Compounds containing anions other than chloride are prepared by metathesis, starting with the chloride and a compound containing the anion to be introduced.

In accordance with the present invention, we have made available a new class of hydrazinium compounds having the general formula:

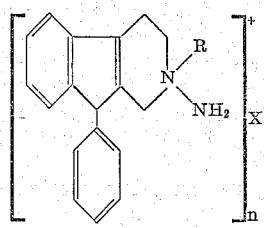

In the above formula, R represents the lower alkyl radical. X is an anion bearing the charge $n$; $n$ also represents the number of cations required to balance the anionic charge.

When our compounds are used for pharmaceutical purposes, X must be a pharmaceutically acceptable anion. The primary attributes of such an anion are nontoxicity and pharamaceutical compatibility. Otherwise, the choice of the anion is of little consequence, since the primary activity of my novel compounds resides in the cation. The salts obtained by variation of the anion may in some cases have special advantages due to solubility, ease of crystallization, lack of objectionable taste and the like, but these considerations are all subsidiary to the characteristics of the cation which are independent of the character of the anion. Hence all variations of X are considered equivalent for the purpose of the present invention. Specific, but non-limiting, variants of X are as follows: chloride, bromide, iodide, sulfate, bisulfate, acetate, salicylate, valerate, oleate, phenate, laurate, borate, benzoate, lactate, nitrate, diglycollate, phosphate, phenylethylbarbiturate, o-acetoxybenzoate, citrate, sulfathiazole, theophyllinate, urate, maleate, fumarate, succinate, tartrate, diethylbarbiturate, penicillinate, camphorate, salicylamide, diphenylhydantoin, carbonate, cacodylate, aconitate, sulfamate, gentisate, malate and the like.

One method of preparing the novel compounds of my invention is to react chloramine with the tertiary amine corresponding to the desired hydrazinium compound; the product is isolated and purified by standard laboratory techniques. Since many of the amines are commercially available as their salts, the hydrochloride being the most common, it has been found convenient to treat aqueous solutions of the amine salts with base and extract the free amine with a solvent such as chloroform. After treatment of the extract with a conventional drying agent, the solution is ready for chloramination. While chloramine is most advantageously prepared as a gaseous chloramine-ammonia mixture obtained from a generator constructed according to the teachings of Sisler et al., U.S. Patent 2,710,248, other methods are equally adaptable for the purpose of the present invention. For instance, chloramine can be made by reacting chlorine with an excess of ammonia in carbon tetrachloride or similar halogenated hydrocarbon solvents under controlled conditions of mixing at low temperatures. Such a process is fully described in U.S. Patent 2,678,258 to John F. Haller. Another effective procedure is that of Coleman et al. fully described in Inorganic Syntheses, vol. I, 59 (1939). For simplicity, when both the amine and the product are soluble in the same inert solvent, e.g., chloroform, chloramine may be formed in situ by this method right in the solution containing the reactant tertiary amine. In general, the choice of solvent is one of economy and simplicity. When performed chloramine is used and good absorption is required for efficient reaction, it has been found desirable to bubble chloramine through a long column of a solution comprising the tertiary amine dissolved in relatively cheap inert solvent. By inert solvent it is meant a solvent unreactive under the condition of the reaction. Solvents which serve this purpose include hydrocarbons, e.g., heptane, cyclohexane, benzene, xylene and the like, ethers e.g., diethyl ether, diamyl ether, dioxane and anisole; amides, e.g., dimethylformamide and dimethylacetamide; halohydrocarbons, e.g., chloroform, carbon tetrachloride, trichloroethylene and chlorobenzene; nitroaromatics, e.g., nitrobenzene. For special purposes, water and other hydroxylic solvents such as ethyl alcohol and Cellosolve may be used. When the reaction is conducted in anhydrous solution, the product often precipitates as the reaction progresses. In aqueous solution, however, it is usually necessary to concentrate or to evaporate to dryness in order to isolate the product.

Another method of preparing the novel compounds of my invention is the reaction of hydroxylamine-o-sulfonic acid with tertiary amines which produces the hydrazinium sulfate corresponding to the tertiary amine used. Preferably the appropriate tertiary amine and hydroxylamine-o-sulfonic acid are allowed to react or are heated together in the presence of an alcoholic solvent but excess amine or other suitable solvents may be used. Even though the use of a solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques.

It is obvious that not all of the novel hydrazinium compounds of my invention are capable of being prepared directly as shown above. In order to provide the other useful salts of the present invention, it is necessary to prepare the compounds containing anions other than chloride or sulfate by methathesis. Many of the anions described supra can be obtained by mixing aqueous solutions of the hydrazinium chloride with appropriate reagents. More often than not, the desired product precipitates directly as the reaction progresses. This is the case where the new salt being formed is less soluble or insoluble in water. Other metathetical approaches are available and the method selected depends on experimental convenience, costs of reagents and the differences in physical properties between the product and the starting material to be utilized in their separation. Reaction of a hydrazinium halide with a soluble silver salt, such as silver nitrate, results in the precipitation of silver halide and the formation of the hydrazinium nitrate. In an analogous manner, treatment of the sulfate with a soluble barium salt results in the precipitation of barium sulfate and conversion to the anion of the barium salt. Quite often the appropriate reactants are heated together in the absence of a solvent and the product isolated by standard laboratory techniques. Another approach independent of the formation of an insoluble solid, is to react the halide with an excess of the desired anion as its acid; hydrogen halide is evolved as the new salt is formed. When it is necessary to prepare a very soluble salt, the reaction of the hydrazinium hydroxide with equivalent amounts of the appropriate acid may be utilized; this approach is also used for the preparation of very pure compounds. (Subjecting a hydrazinium halide to the action of moist silver oxide will give the hydrazinium hydroxide.)

The compounds of the present invention possesses marked pharmaceutical properties. As will be clearly shown in the ensuing specific examples the present compounds exhibit anti-histaminic properties, and may be advantageously administered to living animals to control bronchoconstriction therein.

The scope and utility of my invention is further illustrated by the following exampes:

Example I

Ten grams of 2-amino-2-methyl-9-phenyl-1,2,3,4, tetrahydropyridindinium hydrogen tartrate was treated with aqueous base and the free amine extracted with chloroform. Using the chloramine generator discussed above, the dried chloroform extract was reacted with gaseous chloramine made from 17 g. of chlorine. After filtration from the resultant ammonium chloride, evaporation of the filtrate gave 8.1 g. of crude yellow product which was purified by solution in pyridine and subsequent crystallization therefrom. N-aminophenindaminium chloride was collected by filtration; it was a light yellow solid melting at 216° C. which darkened on standing in air.

Examples II and III

Treatment of separate aqueous solutions of N-aminophenindaminium chloride with saturated aqueous solutions of potassium hexafluorophosphate and with picric acid gave insoluble precipitates which were collected by filtration and dried. There was formed N-aminophenindaminium hexafluorophosphate (M.P. 115° C.) and N-aminophenindaminium picrate (M.P. 117–119° C.) respectively. The latter had the following structural formula:

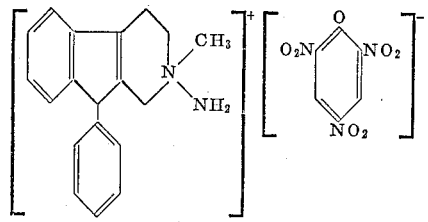

Example IV

To determine the toxicity of N-aminophenindaminium chloride, the compound was dissolved in physiological saline solution at a concentration of 10 mg./ml. and administered intraperitoneally to unstarved male albino mice in dosages of 25, 35, 50, and 100 mg./kg. Mortality data are presented in the table below where values are number of animals dead/number of animals tested:

| Dose (mg./kg.) | Time of Death (hours) | | |
|---|---|---|---|
| | 1 | 24 | 48 |
| 25 | 0/4 | 0/4 | 0/4 |
| 35 | 2/4 | 2/4 | 2/4 |
| 50 | 3/4 | 3/4 | 3/4 |
| 100 | 4/4 | 4/4 | 4/4 |

Within five minutes following injection of N-aminophenindaminium chloride in excess of 35 mg./kg., tremors, clonic convulsions, respiratory depression, and grasping were observed. These signs were not observed at a dosage of 25 mg./kg. All deaths occurred during the first 45 minutes and were apparently the results of respiratory paralysis. Gross examination of the tissues of those mice that succumbed revealed slight incidence of hyperemic lungs. Survivors appeared normal after 24 hours and gross examination of the tissues revealed no significant pathology.

Example V

To determine the pharmocodynamic effects of N-aminophenindaminium chloride, the compound was dissolved in physiological saline solution at concentrations of 1 and 20 mg./ml. An anesthetized female dog, weighing 5.0 kg. received intravenous doses of 0.5, 0.25, 1.25, and 6.25 mg./kg. over a period of approximately 5½ hours.

A slight but transient fall in blood pressure was observed after doses of 0.25 and 1.25 mg./kg. There was no significant effect on respiration at these doses. Following a dose of 6.25 mg./kg., there was immediate respiratory paralysis and a marked fall in blood pressure. There was no apparent or pronounced effect by the compound on the responses to acetylcholine, Adrenalin, Levophed, nicotine, histamine or vagal stimulation during the study.

From the above test it appears N-aminophenindaminium chloride produces slight but transient falls in blood pressure at doses of 0.25 and 1.25 mg./kg. The compound appears markedly effective in producing respiratory depression. It appears to have no significant actions on the antonomic nervous system nor on the hemodynamics of histamine.

Example VI

In order to illustrate the anti-histaminic effect of N-aminophenindaminium chloride, a procedure similar to that disclosed by Loew et al. in Journal of Pharmacological Experimental Therapeutics, 83, 120 (1945) was followed.

Guinea pigs were exposed by inhalation to histamine which was atomized under standard conditions to produce fatal bronchoconstriction in 95% of the animals.

Animals of both sexes, weighing 200 to 300 g. were used. N-aminophenindaminium chloride was dissolved in water at a concentration of 10 mg./ml. and administered orally by stomach tube one hour before subjecting the animals to the atomized histamine solution. The table below summarizes the oral protection given by the compound against the lethal effects of atomized histamine in guinea pigs.

| Dose (mg./kg.) | No. of animals Living/ No. of animals Tested | Percent Protected |
|---|---|---|
| 10.0 | 0/5 | 0 |
| 15.9 | 3/5 | 60 |
| 25.1 | 3/4 | 75 |

It is seen from the above data that at an oral dosage of 25.1 mg./kg. N-aminophenindaminium chloride is 75% effective in preventing fatal bronchoconstriction in test animals due to histamine.

*Example VII*

Guinea pigs were killed by a blow on the head and the ileum removed. Terminal segments of the isolated smooth muscle were suspended in a bath containing 100 ml. of Tyrode's solutions kept at 37° C. The bath was aerated by bubbling a continuous stream of oxygen through it. Intestinal activity was recorded by a balanced ink-writing lever yielding five-fold magnification on a conventional kymograph. A solution of N-aminophenindaminium chloride in water at a concentration of 1 mg./ml. was prepared. Essentially the test consisted of determining whether the compound would prevent contractions of the muscle induced by acetylcholine and histamine phosphate. The results are tabulated below:

| Dose (gamma/100 ml.) | Acetylcholine | Histamine |
|---|---|---|
| 25 | No inhibition | No inhibition. |
| 50 | Partial inhibition | Complete inhibition. |

The above specific examples clearly indicate that the presently intented compounds possess useful pharmaceutical properties, namely antihistaminic properties.

We claim:

1. A compound of the formula:

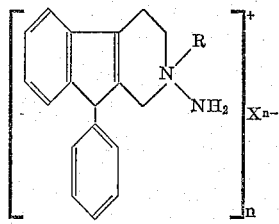

wherein R is lower alkyl and X is an anion and $n$ is equal to the charge of anion X.

2. A compound according to claim 1 wherein R is methyl.

3. The compound N-aminophenindaminium chloride.

4. The compound N-aminophenindaminium hexafluorophosphate.

5. The compound N-aminophenindaminium picrate.

References Cited by the Examiner

UNITED STATES PATENTS 2,955,108  10/60  Omietanski _____ 260—309.6

OTHER REFERENCES

Sternberg et al., Chem. Abstracts, vol. 44, col. 5533 (1950).

WALTER A. MODANCE, *Primary Examiner.*

DUVAL T. McCUTCHEN, *Examiner.*